(12) United States Patent
Muratori et al.

(10) Patent No.: US 6,611,276 B1
(45) Date of Patent: Aug. 26, 2003

(54) GRAPHICAL USER INTERFACE THAT DISPLAYS OPERATION OF PROCESSOR THREADS OVER TIME

(75) Inventors: Richard D. Muratori, Stow, MA (US); Myles J. Wilde, Charlestown, MA (US); Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/386,801

(22) Filed: Aug. 31, 1999

(51) Int. Cl.[7] .............................. G06F 3/00; G06F 13/00; G06F 3/14
(52) U.S. Cl. ..................... 345/772; 345/771; 345/835; 345/966; 709/318; 717/125; 717/127
(58) Field of Search ..................... 345/764, 771, 345/772, 835, 846, 866, 966; 709/100, 102, 107, 318; 717/1, 4, 100, 124, 127, 131, 132, 133

(56) References Cited

U.S. PATENT DOCUMENTS

| | | | | |
|---|---|---|---|---|
| 3,373,408 A | | 3/1968 | Ling .......................... 340/172.5 |
| 3,940,745 A | | 2/1976 | Sajeva .......................... 710/244 |
| 5,168,554 A | * | 12/1992 | Luke .......................... 707/509 |
| 5,339,415 A | * | 8/1994 | Strout, II et al. ............ 709/102 |
| 5,369,570 A | * | 11/1994 | Parad .............................. 705/8 |
| 5,727,209 A | * | 3/1998 | Slingwine et al. ........... 709/102 |
| 5,802,371 A | | 9/1998 | Meier .......................... 395/704 |
| 5,812,133 A | * | 9/1998 | Schultz et al. ............... 345/809 |
| 5,877,764 A | * | 3/1999 | Feitelson et al. ........ 345/846 X |
| 6,067,641 A | * | 5/2000 | McInerney et al. ............ 714/38 |
| 6,105,051 A | * | 8/2000 | Borkenhagen et al. ....... 709/103 |
| 6,282,701 B1 | * | 8/2001 | Wygodny et al. ............ 717/125 |

FOREIGN PATENT DOCUMENTS

| | | |
|---|---|---|
| EP | 0 422 945 A | 4/1991 |
| EP | 0 864 979 A | 9/1998 |

OTHER PUBLICATIONS

"A Graphical Development and Debugging Environment for Parallel Programs", P. Kacsuk et al., Parallel Computing, NL, Elsevier Publishers, Amsterdam, vol. 22, No. 13, Feb. 28, 1997, pps. 1747–1770.

"Analyzing Parallel Program Executions Using Multiple Views", Journal of Parallel and Distributed Computing, US, Academic Press, Duluth, MN, vol. 9, No. 1, Jun. 1, 1990, pps. 203–217.

* cited by examiner

*Primary Examiner*—John Cabeca
*Assistant Examiner*—X. L. Bautista
(74) *Attorney, Agent, or Firm*—Fish & Richardson P.C.

(57) ABSTRACT

A graphical user interface (GUI) includes state indicators which show states of execution of threads running in microengines of a processor. The state indicators show the states of execution as functions of clocking in the processor. The GUI also includes a window showing computer code corresponding to one of the threads.

28 Claims, 19 Drawing Sheets

```
refdes12hw  IXP1200 Developer Workbench - (Receive 0 (0) - PC: 25 (Swapped out)]
File  Edit  View  Project  Build  Debug  Tools  Window  Help    ⟋264

190⎯ nop                                                262⎯    ; If no match do
      Ld_field_w_clr_b[1019!lookup, 0011, $xfer0, 0], load_cc       ; get tr
      br>0_ [trie_walk_setup#], defer[1]                             ; if match, go w
      immed[1019!start_bit, 20]                                      ; start at 2
      immed_w0[1019!start_bit, 28]                                   ; otherw
   trie_walk_setup#:
        immed_w0[1019!temp_base3, trie_base]                         ; load 3
192⎯   immed_w0[1019!temp_base3, trie_base>>16]
   trie_walk#:                                                        ; longest match
196⎯   alu_shf_ri[1019!start_bit, 1019!start_bit, -, 4, 0]
        alu_shf_li [1019! trie_index, 0xf, and, ip_da, >>indirect]    ; get 4
        alu_[1019! trie_loc_offset, 1019! trie_index, +, 1019! lookup]  ; ad
        sram[read, $xfer0, 1019! temp_base3, 1019! trie_loc_offset, word_cnt_1
        Ld_field_w_clr_b[1019!lookup, 0011, $xfer0, 0], load_cc      ; test m
        br>0_[trie_walk#]                                             ; if match itera
        alu_shf_li[--, 0, b, $xfer0, 0]                               : if ent
        br=0_[no_route#]
   get_route#:
        immed_w0[1019!temp_base4, route_table_base]                   ; load share
        immed_w1[1019!temp_base4, route_table_base>>16]

⟋210        ⟋212        ⟋214
   Receive 0 [0.  Receive 6 [..  Transmit 1 [..

Customize...   ⊕  ⊖  ⇐   4629   ⇒   Legend...
                      4605 4610 4615 4620 4625 4630 4635 4640 4645 4650
                                100⎯    trie_walk_setup   ⎯86
   Receive 0 (0) ⎯⎯⎯⎯⎯⎯⎯⎯⎯⎯⎯⎯⎯⎯⎯⎯⎯⎯⎯⎯⎯⎯⎯⎯⎯⎯⎯⎯ sram
      ⎯58a                                          ⎯98
   Receive 1 (0) ⎯⎯⎯⎯⎯⎯⎯⎯⎯⎯⎯⎯⎯⎯⎯⎯⎯⎯⎯⎯⎯⎯⎯⎯⎯⎯⎯⎯ sram
                  sram
                  Slow_port_rec_state                         FIFO Bus Interface
   Receive 2 (0) ⎯⎯⎯⎯⎯⎯⎯⎯⎯⎯⎯⎯⎯⎯⎯⎯⎯⎯⎯⎯⎯⎯⎯⎯⎯⎯⎯⎯
   54              194⎯      198⎯       200⎯

For Help, press F1         uEng/SA: 5602     Fbus: 2240.80
```

FIG. 6 refdes12hw - IXP1200 Developer Workbench - Transmit 1 [3] - PC: 80 [Swapped out]

File  Edit  View  Project  Build  Debug  Tools  Window  Help

Receive 0 [0] - PC: 25 [Swapped out]

```
trie_walk_setup#:
    immed_w0[1019!temp_base3, trie_base]                    ; load sha
    immed_w1[1019!temp_base3, trie_base>>16]
trie_walk#:                                                 ; longest match se
    alu_shf_ri[1019!start_bit, 1019 ! start_bit, -, 4, 0]
```

Transmit 1 [3] - PC: 80 [Swapped out]

```
            ctx_swap, defer[1]                              ; read packet_link
    Ld_field_w_clr_a[tail_ptr, 0011, $queue_descriptor0, 0]
    Ld_field_w_clr_b[ele_remaining, 0001, $packet_link1, 0]
    alu_shf_li[freelist, 0x7, and, $packet_link1, >>16]
    alu_shf_li[buf_offset, 0, +16, $queue_descriptor0, >>11]
```

Receive 6 [1] - PC: 25 [Swapped out]

```
rec_enqueue#:
rec_queue_addr#:
        alu_shf_li[tempb, 0x7, and, rec_state, >>16]        ; get free
        alu_shf_li_[--, 0x3, -, tempb, 0]
        br=0_[rec_enqueue_multicast#],                      ; dtype ==multice
```

| Customize... | 🔍 | 🔍 | ⬅ | 5263 | ➡ | Legend.. |

```
              4605  4610  4615  4620  4625  4630  4635  4640  4645  4650
Receive 8 [2]
Receive 9 [2]        —                            —     —
Receive 10 [2]  —    —                                               —
Receive 11 [2]  —                                                    —
Transmit 0 [3]      #####                        #####
Transmit 1 [3]      #####                        #####
Transmit 2 [3]  —   #####                        #####               —
Transmit 3 [3]      #####    —                   #####
```

| For Help, press F1 | uEng/SA: 5602 | Fbus: 2240.80 |

*FIG. 14*

```
refdes12hw - IXP1200 Developer Workbench (Receive 0(0)  -PC: 25(Swapped out))
File  Edit  View  Project  Build  Debug  Tools  Window  Help ; If no match do
  nop
  ld_field_w_clr_b[1019!lookup, 0011, $xfer0, 0], load_cc           ; get tr
  br>0_[trie_walk_setup#], defer[1]                                 ; if match, go w
  immed[1019!start_bit, 20]                                         ; start at 2
  immed_w0[1019!start_bit, 28]                                      ; otherw
trie_walk_setup#:
  immed_w0[1019!temp_base3, trie_base]                              ; load 3
  immed_w0[1019!temp_base3, trie_base>>16]
trie_walk#:                                                         ; longest match
  alu_shf_ri[1019!start_bit, 1019!start_bit, -, 4, 0]
⇨ alu_shf_li_[1019! trie_index, 0xf, and, ip_da, >>indirect]       ; get 4
  alu_[1019! trie_loc_offset, 1019! trie_index, +, 1019! lookup]    ;ad
  sram[read, $xfer0, 1019! temp_base3, 1019! trie_loc_offset, word_cnt_1
  Ld_field_w_clr_b[1019!lookup, 0011, $xfer0, 0], load_cc           ; test m
  br>0_[trie_walk#]                                                 ; if match itera
  alu_shf_li[--, 0, b, $xfer0, 0]                                   : if ent
  br=0_[no_route#]
get_route#:
  immed_w0[1019!temp_base4, route_table_base]                       ; load share
  immed_w1[1019!temp_base4, route_table_base>>16]
  Ld_field_w_clr_b[1019!route_ent_offset, 0011, $xfer0, >>16]
  ctx_arb[sdram],
  defer[1]
  ; BRANCH LATENCY FILL OPTIMIZATION: the uword below was "pushed" do
  alu_shf_li_[1019!route_ent_offset, 0, b, 1019!route_ent_offset, >>1]
    .if (bit(rec_state, 9) == 1) ; if eop
  br_bclr[rec_state,9,1006_01#]
       fast_wr[3, thread_done]           ; notify receive scheduler with
    .else
br[1006_ends#]
[ 1006_01#:
       fast_wr[1, thread_done]    ; notify receive shceduler with
    .endif ?Receive 0 [0...  ?Receive 6 [.....  ?Transmit 1 [.....
For Help, press F1   uEng/SA: 5602    Fbus: 2240.80   LN 641, COL 6
```

*FIG. 15*

```
┌─ refdes12hw/IXP1200 Developer Workbench - (Receive 0 (0) - PC: 25 (Swapped out)) ─┐
│ File  Edit  View  Project  Build  Debug  Tools  Window  Help                      │
├───────────────────────────────────────────────────────────────────────────────────┤
│  🗋 📂 💾  ✓ Toolbar           🔽 📋 👓 ≔ 📖 ⤴                                  ▽ │
│            ✓ Status Bar              ┌─231        ; If no match do                │
│  nop       ✓ Workbook mode           xfer0, 0], load_cc  ; get tr                 │
│  ld_field_w_c  Project Workplace                                                  │
│  br>0_[trie_w  Output Window   ┌─232              ; if match, go w                │
│  immed[1019    Debug Windows  ▷ ┌──────────────┐                                  │
│  immed_w0[1019!start_bit, 28]   │ Command Line │                                  │
│  trie_walk_setup#:              │ Run Control  │                                  │
│    immed_w0[1019!temp_base3, trie_bas│ Data Watch  │ ┌─234                        │
│    immed_w0[1019!temp_base3, trie_bas│ Thread History │                           │
│  trie_walk#:                    │ Thread Status│                                  │
│                                 └──────────────┘ ; longest match                  │
│    alu_shf_ri[1019!start_bit, 1019!start_bit, -, 4, 0]                            │
│    alu_shf_li_[1019! trie_index, 0xf, and, ip_da, >>indirect]  ; get 4            │
│    alu_[1019! trie_loc_offset, 1019! trie_index, +, 1019! lookup] ;get 4          │
│    sram[read, $xfer0, 1019! temp_base3, 1019! trie_loc_offset, word_cnt_1         │
│    ld_field_w_clr_b[1019!lookup, 0011, $xfer0, 0], load_cc  ; test m              │
│    br>0_[trie_walk#]                              ; if match itera                │
│    alu_shf_li[--, 0, b, $xfer0, 0]                : if ent                        │
│    br=0_[no_route#]                                                               │
│  get_route#:                                                                      │
│    immed_w0[1019!temp_base4, route_table_base]        ; load share                │
│    immed_w1[1019!temp_base4, route_table_base>>16]                                │
│    ld_field_w_clr_b[1019!route_ent_offset, 0011, $xfer0, >>16]                    │
│    ctx_arb[sdram],                                                                │
│    defer[1]                                                                       │
│    ; BRANCH LATENCY FILL OPTIMIZATION: the uword below was "pushed" do            │
│    alu_shf_li_[1019!route_ent_offset, 0, b, 1019!route_ent_offset, >>1]           │
│       .if (bit(rec_state, 9) == 1)  ; if eop                                      │
│    br_bclr[rec_state,9,1006_01#]                                                  │
│           fast_wr[3, thread_done]  ; notify receive scheduler with                │
│       .else                                                                       │
│          br[1006_ends#]                                                           │
│    [ 1006_01#:                                                                    │
│           fast_wr[1, thread_done]    ; notify receive shceduler with              │
│       .endif                                                                      │
├───────────────────────────────────────────────────────────────────────────────────┤
│ ⚑Receive 0 [0... ⚑Receive 6 [..... ⚑Transmit 1 [.....                              │
│ Toggles displays of the thread ex│uEng/SA: 5602│Fbus: 2240.80│Ln 641, COL 6       │
└───────────────────────────────────────────────────────────────────────────────────┘
```

*FIG. 16*

```
alu_shf_ri[1019!start_bit, 1019
alu_shf_li_[1019!trie_index, 0x
alu_[1019!trie_loc_offset, 1019
sram[read, $xfer0,1019! temp_ba
ld_field_w_clr_b[1019!lookup, 0
br>0 [trie_walk#]
alu_shf_li[--, 0,b, $xfer0, 0]
br=0 [no_route#]
get_route#:
    immed_w0[1019!temp_base4, route
    immed_w1[1019!temp_base4, route
    Ld_field_w_clr_b[1019!route_ent
    ctx_arb[sdram],
    defer[1]
; BRANCH LATENCY FILL OPTIMIZAT
    alu_shf_li_[1019!route_ent_offs
    .if (bit(rec_state, 9) ==1
    br_bclr[rec_state,9,1006_01#]
        fast_wr[3, thread_done]
    .else
        br[1006_end#]
1006_01#:
        fast_wr[1, thread_done]
    .endif
1006_end#:
    sdram[read, $$route_entry0, 101
no_route#:
got_output_port#:
    alu_[rec_state, rec_state, or,
.endlocal
write_network_layer#:
    sdram_ai[write, $$xfer0, 0, pac:
    local_queue_descriptor_addr descri:
    .if (bit(rec_state, 9) ==0)
```

- Refdes12hw threads
- Chip [unnamed>]
  - MicroEngine 0
    - Receive 0 (0)
    - Receive 1 (0)
    - Receive 2 (0)
    - Receive 3 (0)
  - MicroEngine 1
    - Receive 4 (1)
    - Receive 5 (1)
    - Receive 6 (1)
    - Receive 7 (1)
  - MicroEngine 2
    - Receive 8 (2)
    - Receive 9 (2)
    - Receive 10 (2)
    - Receive 11 (2)
  - MicroEngine 3
    - Transmit 0 (3)
    - Transmit 1 (3)
    - Transmit 2 (3)
    - Transmit 3 (3)
  - MicroEngine 4
    - Rec Scheduler (4)
    - Unused (4)
    - Unused (4)
    - Unused (4)
  - MicroEngine 5
    - Xmit Scheduler (5)
    - Xmit Arbiter (5)
    - Unused (5)
    - Unused (5)

```
refdes12hw - IXP1200 Developer Workbench - [rec_lmatch.uc]
File  Edit  View  Project  Build  Debug  Tools  Window  Help sram[read, $xfer0, temp_base3, trie_loc_offset,1], ctx_swap;
        1d_field_w_clr_[lookup, 0011, $xfer0],load_cc  ; test match and
        br>0_[trie_walk#]                              ; if match iterat
        alu_shf_li[-0, b, $xfer0]                      : if entry/lookup
        br=0_[no_route#]

get_route#:
        Immed_w0[temp_base4, route_table_base]         ; load shared add
        Immed_w1[temp_base4, route_table_base>>16]
        1d_field_w_clr[route_ent_offset, 0011, $xfer0, >>16]

//
    // the transfer from rfifo was done at the top of ipverify, in order to f
    // we should have the signal back well before now
    //
    # ifndef STANDALONE
        ctx_arb[sdram]
```

Receive 0 [..] | Receive 6 [..] | Transmit 1 [..] | Receive 9 [..] | Rec_lmatch.uc

CUSTOMIZE...     4633     LEGEND...

5575 5580 5585 5590 5595 5600 5605 5610 5615 5620

Receive 5 (1) ─────────────────   ──────          ######
                                                  FIFO Bus Interface Receive 6 (1)                                     ######

Receive 7 (1)                                     ######
              ######

Receive 8 (2)                                     ──  ──

Receive 11 (2)                                    ──

For Help, press F1 | uEng/SA: 5603 | Fbus: 2240.80 | Ln 638, Col 2

*FIG. 19*

GRAPHICAL USER INTERFACE THAT DISPLAYS OPERATION OF PROCESSOR THREADS OVER TIME

BACKGROUND OF THE INVENTION

This invention relates to a graphical user interface ("GUI") which shows an operational history of computer code.

Debugging computer code can be a time-consuming and difficult task. This is particularly true for code used with parallel processors, in which several computer programs, or "threads", are executed concurrently. These threads may interact with other code and with various hardware devices, making it difficult to determine where problems or inefficiencies in the code lie.

SUMMARY OF THE INVENTION

In one aspect, the invention is a GUI which includes a display that shows an operational history of a thread for use in a microengine of a processor. The displayed operational history provides a programmer with information that can be useful in debugging code in the thread and/or in designing more efficient code for the thread.

This aspect may include one or more of the following. The operational history may include states of execution of the thread as a function of time. Different states of execution may be displayed as different colors, and may include a first state in which the thread is executing, a second state in which the thread has been aborted, and a third state in which the thread is stalled.

The GUI may display operational states associated with the microengine. These states may include a first state in which the microengine is idle, and a second state in which the microengine is disabled. The GUI may also display event indicators that show reference events that relate to the thread as a function of time. The event indicators may include one or more of a first indicator which indicates that the thread has issued a reference to a device, a second indicator which indicates that the reference has been queued by the device, a third indicator which indicates that the reference has been removed from a queue by the device for processing, a fourth indicator which indicates that processing is done, a fifth indicator which indicates that a signal has been issued to the thread that processing is done, and a sixth indicator which indicates that the signal has been consumed by the thread.

The reference events may relate to a device in communication with the thread, and the GUI may include an identifier which identifies the device to which the reference events relate. The GUI may include a window which shows computer code for the thread, a first pointer which is movable through states of execution of the computer code, and a second pointer which is movable relative to the computer code to indicate a portion of the computer code executing at a state of execution.

The GUI may display operational histories of multiple threads for use in microengines of the processor. The GUI may therefore include multiple windows for showing computer code corresponding to more than one of the multiple threads. The GUI may include a code label that is displayed relative to a state of execution of computer code in the thread. The code label corresponds to a routine in the computer code that is executing at the state of execution. A window may be provided for selecting the code label. Time in the GUI may be defined by cycles of the processor.

In another aspect, the invention is a GUI that includes state indicators which show states of execution of threads running in microengines of a processor. The state indicators show the states of execution as functions of clocking in the processor. A window in the GUI shows computer code corresponding to one of the threads.

This aspect may include one or more of the following. The state indicators may show different states of execution in different colors. The GUI may include event indicators which show reference events that relate to one or more of the threads as functions of the clocking in the processor. The GUI may include identifiers which identify devices to which the reference events relate, a first pointer which is movable relative to one of the state indicators, and a second pointer which is movable relative to the computer code in the window to indicate a portion of the computer code executing at a state of execution. The state indicators may be linear and may be displayed relative to cycles of the processor. The window may show the computer code in read-only format, and an option may be provided to display the computer code in read/write format.

Other features and advantages will become apparent from the following description, claims, and drawings.

BRIEF DESCRIPTION OF THE DRAWINGS

FIG. 6 shows a configuration of the GUI with a window for displaying computer code in the threads.

FIG. 14 shows a configuration of the GUI with multiple windows for displaying code in the threads.

FIG. 15 shows a configuration of the GUI without the operational histories.

FIG. 16 shows another menu for altering the display configuration of the GUI.

FIG. 17 is a GUI showing the operation of currently-executing computer code in one or more threads.

FIG. 19 shows the GUI displaying the source code.

DESCRIPTION OF THE PREFERRED EMBODIMENT

Figure 1:
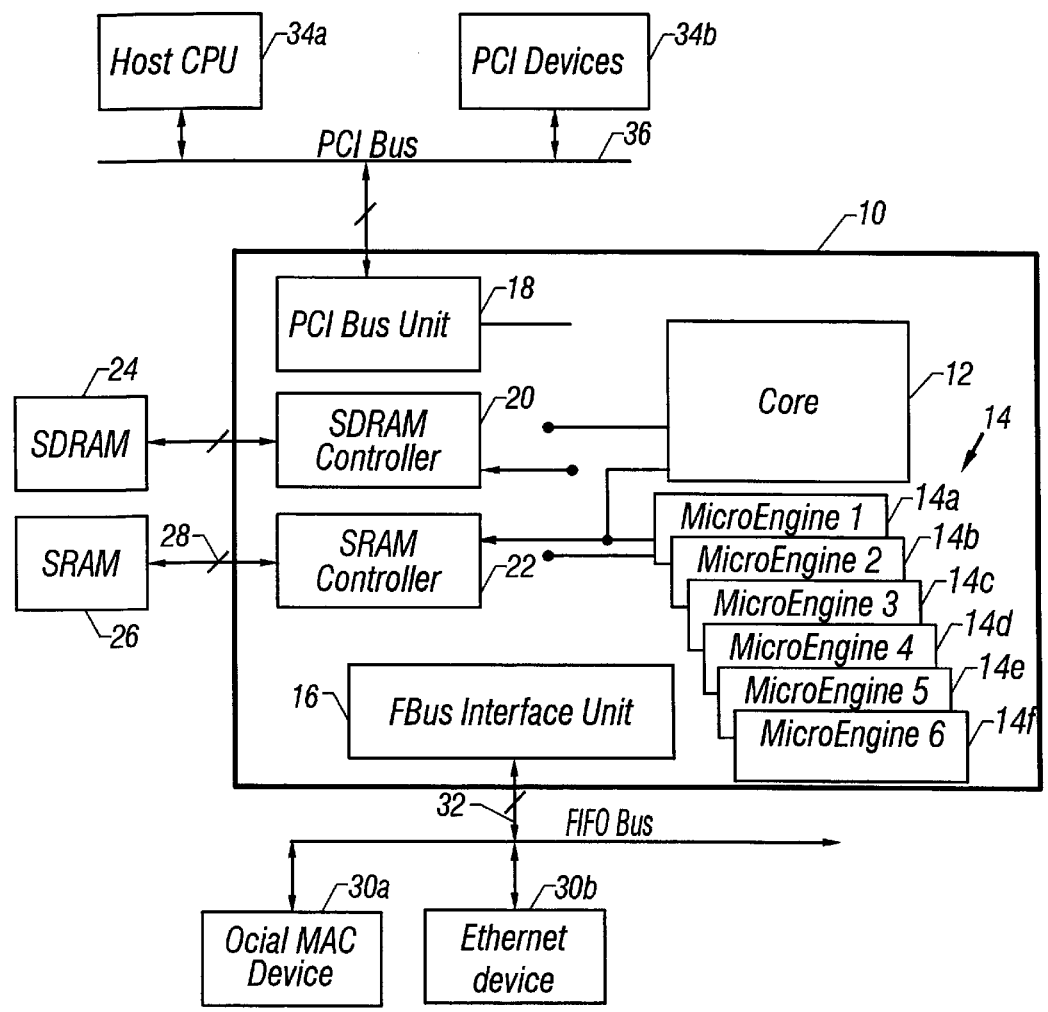
FIG. 1 is a view of a processor having a plurality of microengines.

Referring to FIG. 1, a hardware-based, multithreaded processor 10 is shown. Processor 10 may be used in network applications or other applications such as print engines and the like. Processor 10 includes core 12, microengines 14, Fbus interface unit 16, PCI (Peripheral Component Interface) bus unit 18, SDRAM (Static Random Access Memory) controller 20, and SRAM (Synchronous Dynamic Random Access Memory) controller 22.

Core 12 is a central controller that manages the resources of processor 10, loads microcode threads into microengines 14, and performs other general-purpose computing functions, such as handling protocols, exceptions, support for packet processing, and the like. Core 12 may be a general-purpose 32-bit RISC (Reduced Instruction Set Computer) microprocessor, for example.

Microengines 14 support up to four threads per engine, which are executed in parallel to perform various tasks. Microengines 14 operate with shared resources, including bus units 16 and 18 and memory controllers 20 and 22. SDRAM controller 20 and associated SDRAM 24 are typically used for processing large volumes of data, such as network payloads from network packets. SRAM controller 22 and associated SRAM 26 are used in networking applications for low-latency, fast-access tasks, such as accessing look-up tables, providing memory for core 12, and the like.

Microengines 14 access either SDRAM 24 or SRAM 26 through their respective controllers 20 and 22 based on characteristics of received data. For example, low-latency, low-bandwidth data is stored in, and retrieved from, SRAM 26. Higher-bandwidth data, for which latency is not important, is stored in, and retrieved from, SDRAM 24.

The parallel execution of threads in microengines 14 is illustrated in the context of SDRAM and SRAM memory access operations. An SRAM access requested by a "Thread_0" from microengine 14a will cause SRAM controller 22 to initiate an access to SRAM 26. SRAM controller 22 arbitrates access to SRAM bus 28, accesses data in SRAM 26, retrieves the data from SRAM 26, and returns the data to microengine 14a. During an SRAM access, if microengine 14a had only a single thread that could execute, microengine 14a would be dormant until the data was returned from SRAM 26. By employing hardware-context thread swapping within each of microengines 14, other threads can execute during this otherwise dormant period.

For example, "Thread_1" can execute while Thread_0 is waiting for data from SRAM 26. During its execution, Thread_1 may access SDRAM 24. While Thread_1 is performing this operation, and Thread_0 is accessing SRAM 26, a new thread ("Thread_2") can execute in microengine 14a. Thread_2 can execute for a certain amount of time until it needs to access memory or perform some other long latency operation, such as accessing a bus via one of the bus units 16 and 18. Thus, simultaneously, microengine 14a can perform a bus operation, an SRAM operation, and an SDRAM operation, and still have additional thread(s) for data processing.

Processor 10 interfaces to network devices 30 on Fbus 32 through Fbus interface unit 16. Fbus 32 is a 64-bit wide FIFO (First-In First-Out) bus. Fbus interface unit 16 contains transmit and receive buffers and a FIFO bus interface to network devices 30. Examples of network devices 30 include a 10/100 BaseT Octal MAC (Media Access Control) device 30a and a Gigabit Ethernet device 30b. Generally speaking, processor 10 can interface to any type of communication device or interface that sends/receives data packets to/from a network.

Processor 10 interfaces to devices 34 on PCI bus 36 through PCI bus unit 18. PCI bus unit 18 is an integrated 32-bit PCI interface which provides an interface for applications on devices 34 that require an uplink to another subsystem or for I²O applications. Devices 34 may include a host computer/CPU (Central Processing Unit) 34a or other devices 34b for use in debugging processor 10.

Figure 2:
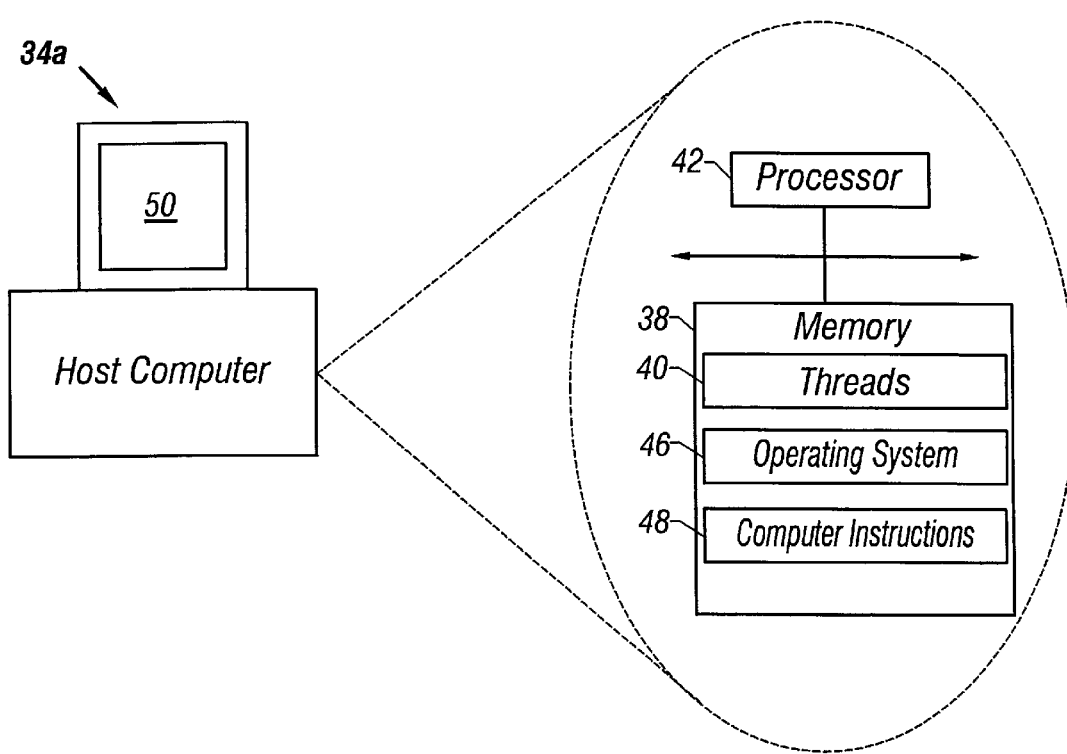
FIG. 2 is a view of a host computer.

Referring to FIG. 2, host computer 34a includes a memory 38 which stores threads 40 for microengines 14 and a processor 42 for retrieving threads 40 and providing them to processor 10 over PCI bus 36 (see view 44). Also stored in memory 38 are an operating system 46, such as Windows98®, and computer instructions 48 for simulating processor 10, including the operation of threads 40 in microengines 14. Computer instructions 48 can also be executed on a computer that is not coupled to PCI bus 36, but which is nevertheless performing simulations on the threads.

When executed, computer instructions 48 generate a GUI (for display on display screen 50) which allows a programmer to view results of the simulations and to debug computer code in threads 40. Information displayed in the GUI that relates to operations performed by processor 10 and microengines 14 is simulation information, not actual test information. Therefore, references herein to operations of processor 10, microengines 14, and other devices refer to simulations, not actual device operations.

Figure 3:
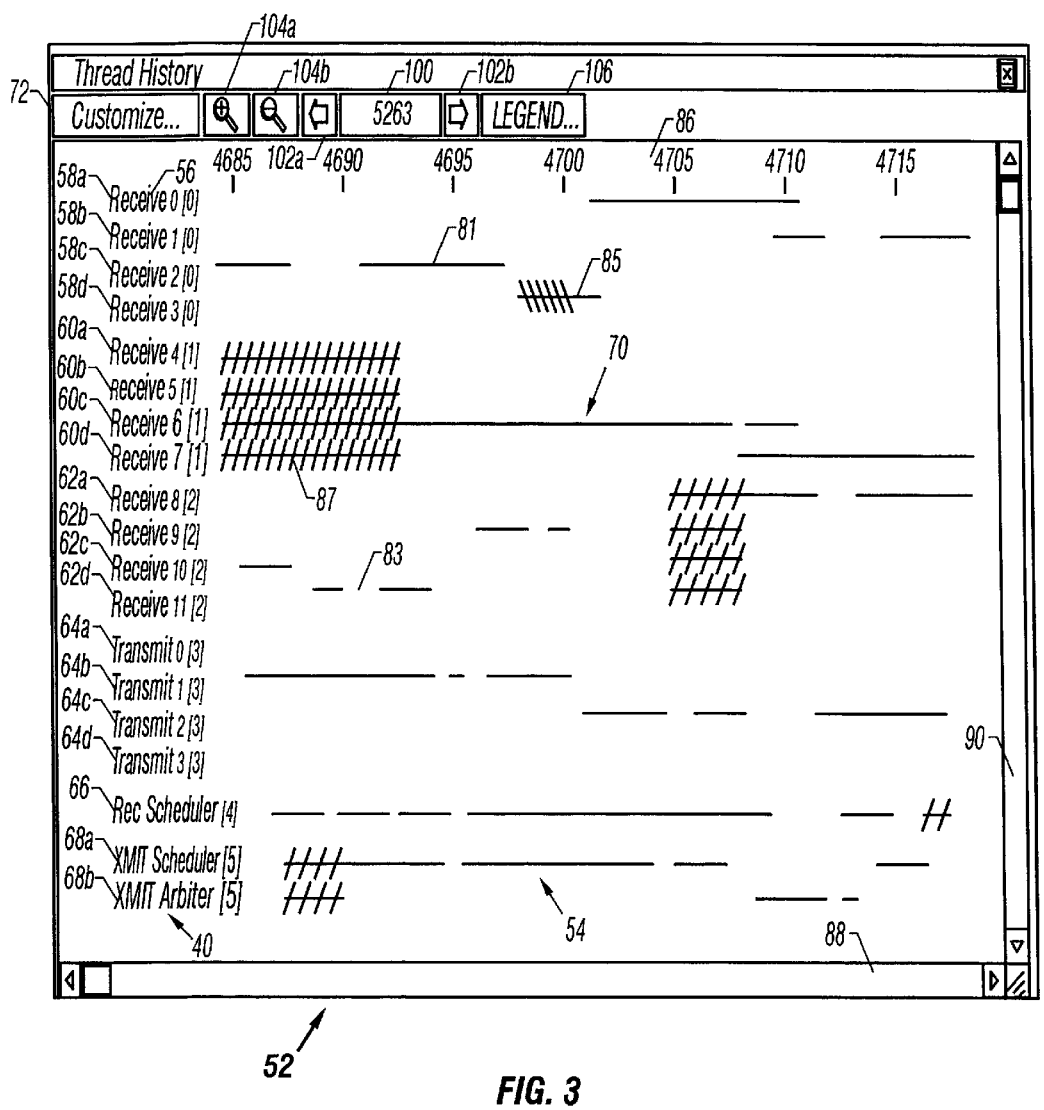
FIG. 3 is a GUI showing operational histories of threads executing in the microengines.

Referring to FIG. 3, a GUI 52 that is generated by computer instructions 48 is depicted. GUI 52 shows the operational history of computer code in threads 40 identified in display area 54. The microengine in which each of threads 40 executes is indicated by parenthetical numbers 56 following the thread names. For example, "Receive 0" thread 58a, "Receive 1" thread 58b, "Receive 2" thread 58c, and "Receive 3" thread 58d are all executing in microengine "(0)" (14a, FIG. 1). Threads 60a to 60d execute in microengine 14b; threads 62a to 62d execute in microengine 14c; threads 64a to 64d execute in microengine 14d; thread 66 executes in microengine 14e; and threads 68a and 68b execute in microengine 14f.

While each microengine may execute four threads, each microengine may execute less than four threads (in other embodiments, the microengines may execute more than four threads as well, which would be reflected in GUI 52). All threads that execute in the microengines may be displayed, or any subset thereof may be displayed. A user can select which threads are displayed.

GUI 52 also includes state indicators 70. State indicators 70 are horizontal (linear) bars which reflect states of execution of the threads (and the microengines) as functions of time. Different states of execution are represented as different colors.

The states of execution are obtained by computer instructions 48 from routine(s) simulating processor 10. The routine(s) maintain the states of execution displayed by the GUI. This state information can be obtained directly from the routine(s) or, alternatively, from a memory where the state information is archived by the routine(s).

Colors for the different states may be set by clicking on customize button 72 using a mouse or other input device (not shown). Clicking on customize button 72 causes window 74 (FIG. 4) to be displayed. Selecting "Colors" tab 76 displays window 78. Window 78 identifies "Execution state colors" 80 and "Reference colors" 82. "Reference colors" 82 are described below. "Execution state colors" 80 include icons that identify different execution states of the threads and the microengines. These execution state icons include, but are not limited to, an "Instruction Executing" state 80a in which a microengine is executing instructions in a thread; an "Instruction Aborted" state 80b in which a microengine has aborted executing instructions in a thread; a "Thread Stalled" state 80c in which a microengine has stalled during execution of instructions in a thread; a "Microengine Idle" state 80d in which a microengine is idle; and a "Microengine Disabled" state (not shown) in which a microengine has been disabled. State indicators 81 (FIG. 3) for "Instruction Executing" state 80a may be displayed in green. State indicators 83 for "Instruction Aborted" state 80b may be displayed in yellow. State indicators 85 for "Thread Stalled" state 80c may be displayed in red. State indicators 87 for "Microengine Idle" state 80d may be displayed in blue. The "Microengine Disabled" state may be displayed as a dashed line or a color coded indicator.

The black and white figures attached hereto make it difficult to distinguish between red, blue and green (yellow is the "lightest" color). Accordingly, left hatching ("\\\\") is provided to distinguish red, right hatching ("////") is provided to distinguish blue, and no hatching is provided to distinguish green. Hatching is used for the this application only, and is not used in the GUI.

Using the state indicators, a programmer can attempt to optimize code in the threads. For example, the programmer can change code in the threads to reduce microengine idle time and thus obtain more efficient code.

Clicking on pull-down bars in 80a to 80d allows a user to change the state indicator color settings, and clicking on "Apply" button 84 applies the new settings. "OK" button 86 saves the new settings and "Cancel" button 88 exits window 74 without saving the new settings. As indicated in window 74, the execution state colors are used for pointers in thread code (see below).

In FIG. 3, time is defined in terms of clocking, or "clock cycles", of processor 10. Clock cycles 86 are displayed horizontally, roughly along the same axis as state indicators 70. The user can scroll through the operational history of displayed threads (horizontally) using scroll bar 88. Similarly, the user can scroll through additional threads (vertically) using scroll bar 90.

Figure 5:
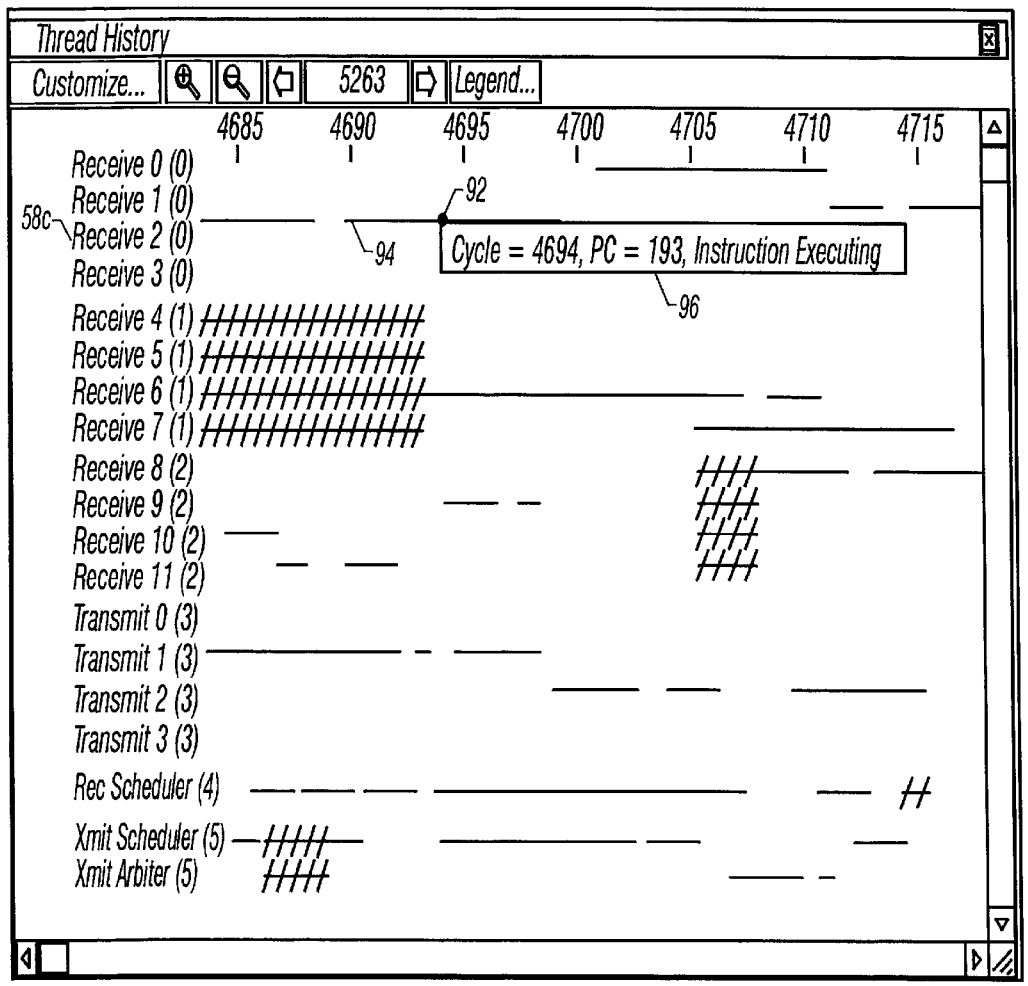
FIG. 5 shows information available from the GUI.

Pointing (without clicking) a mouse (or other input device) to a state indicator causes information to be displayed to the user. For example, as shown in FIG. 5, pointing to point 92 on state indicator 94 displays information 96. Information 96 identifies the cycle at point 94 of thread 58c ("Cycle=4694") and the instruction of thread 58c executing at that point ("PC=193").

GUI 52 also includes a pointer that identifies a particular processor cycle in one-cycle increments. The pointer is not shown in FIG. 3 or 5 (scrolling right using scroll bar 88 would reveal the pointer at cycle 5263); however, it is shown as reference numeral 98 in FIG. 6 (described below). The cyclical location of pointer 98 is specified in field 100 (FIG. 3). Arrows 102a and 102b move this pointer left and right, respectively, relative to the state indicators; although the pointer could also be moved by "grabbing" it with a mouse and dragging it horizontally.

Zoom-in arrow 104a and zoom-out arrow 104b allow a user to view more or less cycles, respectively. For example, in FIG. 6, cycles 86 are displayed closer together than in FIG. 3 as a result of a zoom-out operation.

Figure 7:
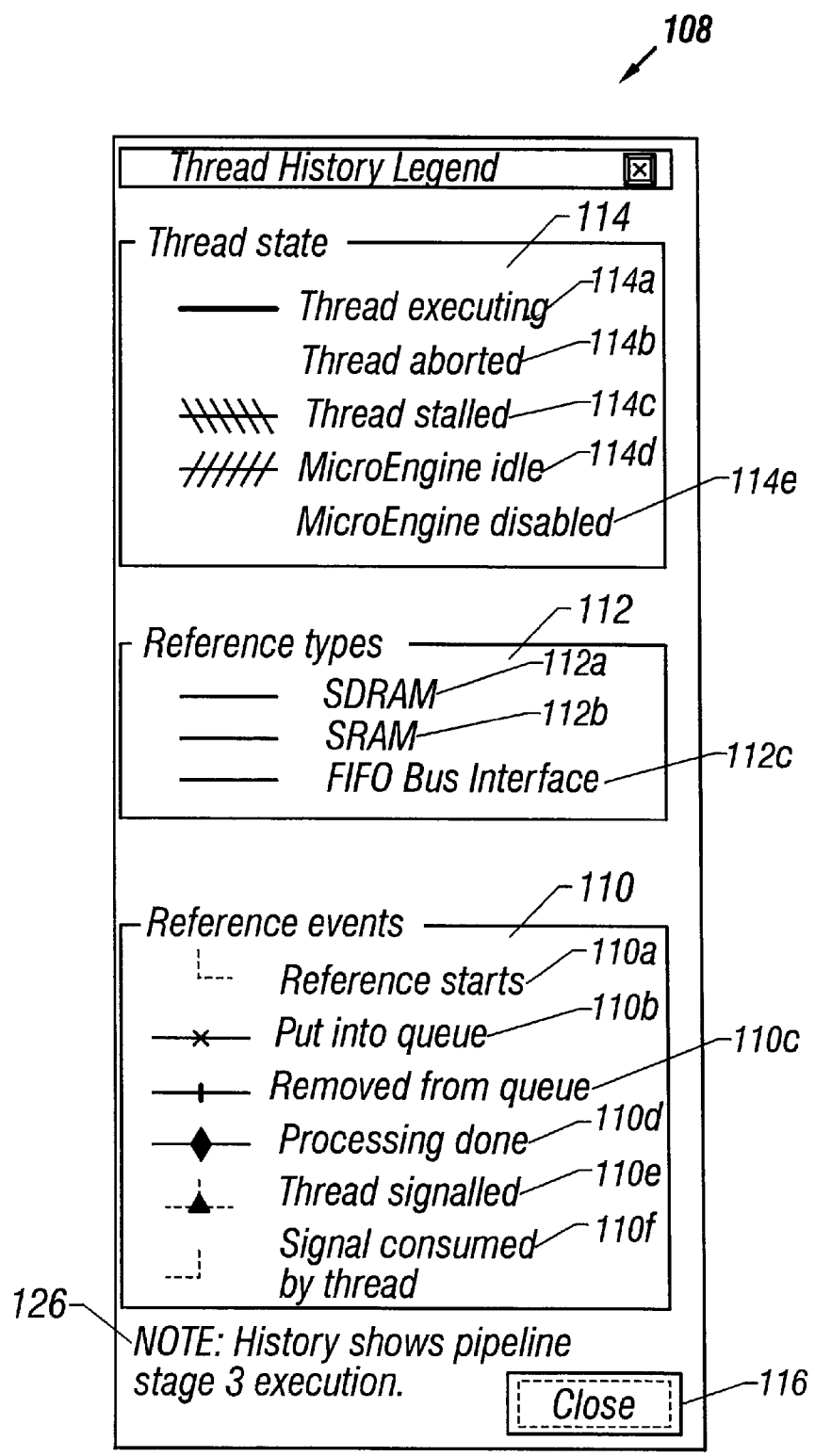
FIG. 7 is a window showing a legend for the GUI.

Clicking on legend button 106 displays the thread history legend 108 shown in FIG. 7. Thread history legend 108 includes reference event information 110, reference type information 112, and thread state information 114, as well as "Close" button 116 for closing thread history legend 108. Thread state information 114 defines the "look" of the state indicators for the execution states of threads in GUI 52. For example, as described above, green indicates a "Thread executing" state 114a, yellow indicates a "Thread aborted" state 114b, red indicates a "Thread stalled" state 114c, blue indicates a "Microengine idle" state 114d, and a dashed line indicates a "Microengine disabled" state 114e.

Reference events information 110 identifies symbols associated with reference events that relate to threads displayed in GUI 52. Reference events are operations performed between threads and devices within/interfaced to processor 10, such as Fbus interface unit 16, SRAM 26, SDRAM 24, and SRAM controller 22 (FIG. 1). For example, reference events may comprise operations performed by a thread to retrieve data from SRAM 26. These operations may include the thread issuing a reference (i.e., a request) to SRAM controller 22 to obtain data from SRAM 26; SRAM controller 22 queuing the request; SRAM controller 22 removing the request from its queue for processing; SRAM controller 22 issuing a signal to the thread indicating that processing has been performed; and the thread consuming the signal (meaning that the thread receives the signal and, thereafter, the requested data).

Figure 8:
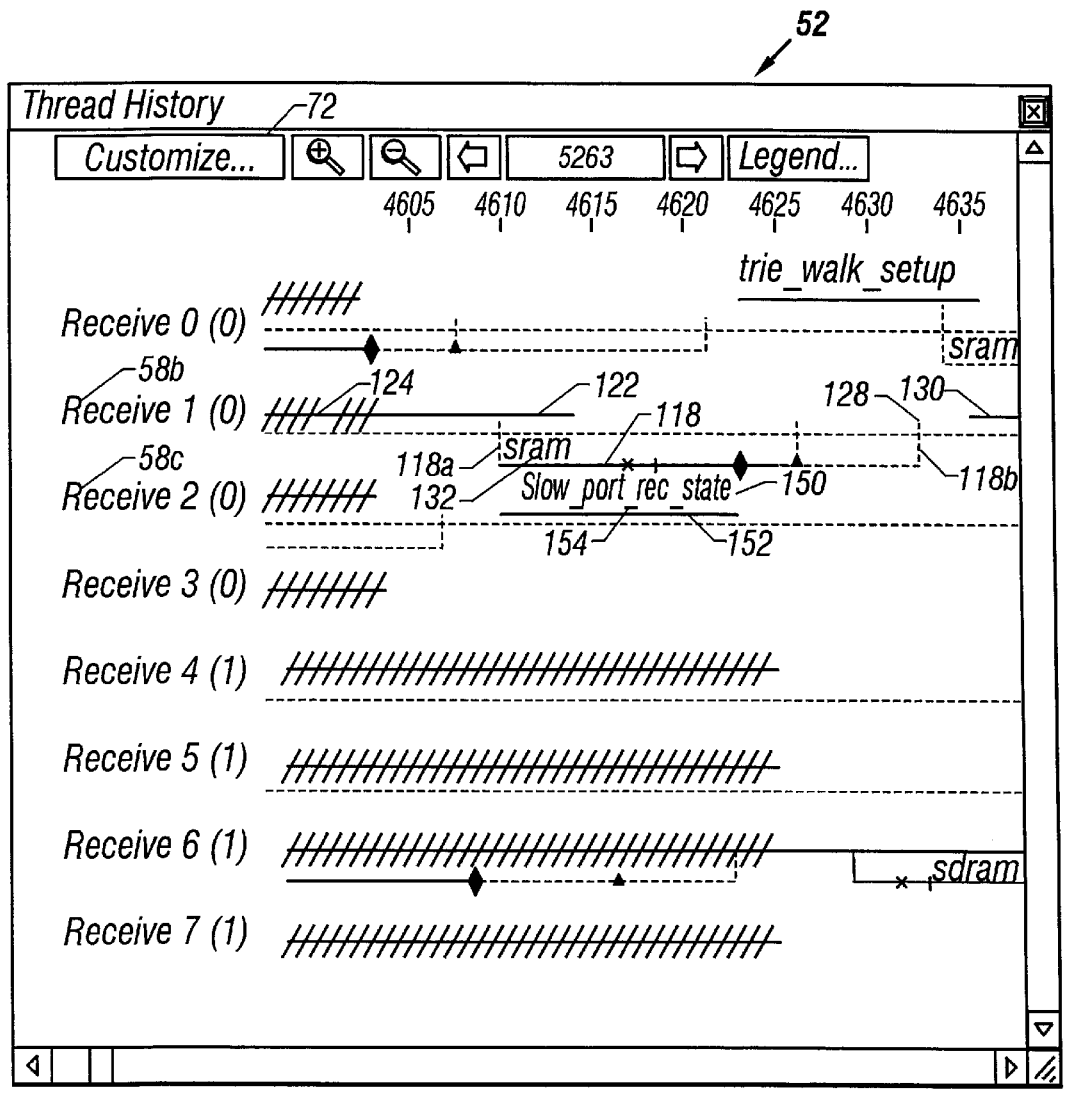
FIG. 8 shows code identifiers and indicators for reference events that relate to the threads.
Figure 9:
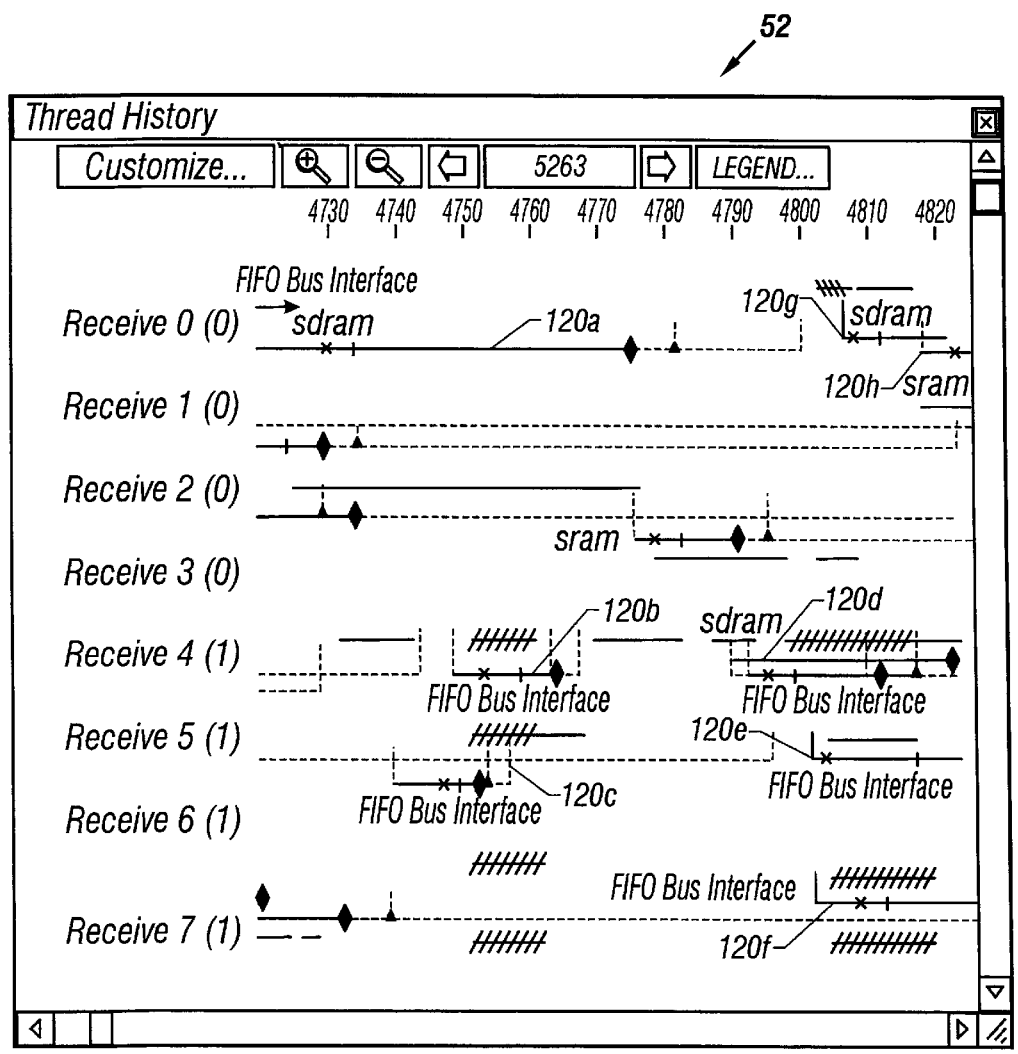
FIG. 9 shows indicators for plural threads.

Referring to FIGS. 7 and 8, GUI 52 also displays event indicators 118. Event indicators 118 relate to reference events, such as those described above. These event indicators include a "Reference starts" indicator 110a which indicates that a selected thread has issued a reference to a device; a "Put into queue" indicator 110b which indicates that the reference has been queued by the device; a "Removed from queue" indicator 110c which indicates that the reference has been removed from the queue by the device for processing; a "Processing done" indicator 110d which indicates that processing of the request is done; a "Thread signalled" indicator 110e which indicates that a signal has been issued to the thread that processing is done; and a "Signal consumed by thread" indicator 110f which indicates that the signal has been consumed by the thread. A thread is selected by pointing and clicking using a mouse or other device. FIG. 9 shows event indicators 120a to 120h displayed for several threads.

In FIG. 8, event indicators are shown for a complete operation (from "reference starts" to "signal consumed") in thread 58b. "Reference starts" indicator 118a takes place while thread 58b is in an execution state (as opposed to an aborted or a stalled state). Thereafter, thread 58b enters an idle state at point 122, after which the state indicator 124 for thread 50b is no longer displayed. Processing performed for the reference events can continue, however, since it is performed by other devices, such as SRAM controller 22. In FIG. 8, it appears, based on "Signal consumed by thread" indicator 118b, that thread 58b consumes a signal while it is idle (this is because thread 58b appears not to start again until about cycle 4635). However, this is not the case.

More specifically, the threads operate in different pipeline stages. Operation starts at a "wake-up" stage, after which it progresses through to an "execution" stage during which the thread is executed. This execution stage is referred to in FIG. 7 as "pipeline stage 3 execution" 126. It is the execution stage that state indicators 70 reflect. Thus, although thread 58b may be operating at point 128, making it possible for thread 58b to consume a signal, state indicator 130 will not indicate that thread 58b is operating until thread 58b is in an execution stage.

In alternative embodiments, GUI 52 can be modified to show any other pipeline stages of the microengine threads, or to show multiple execution stages at the same time, in response to a user input, for example.

Referring back to FIG. 7, reference types information 112 are identifiers relating to devices that are associated with reference events. For example, in FIG. 8, identifier 132 indicates that the processing of event indicators 118 is being performed with respect to SRAM 26 (hence the label "sram"). Other identifiers may also be used, depending upon the reference events. For example, FIG. 7 specifies identifiers for reference events relating to "SDRAM" 112a, "SRAM" 112b, and "FIFO Bus Interface" 112c.

Figure 4:
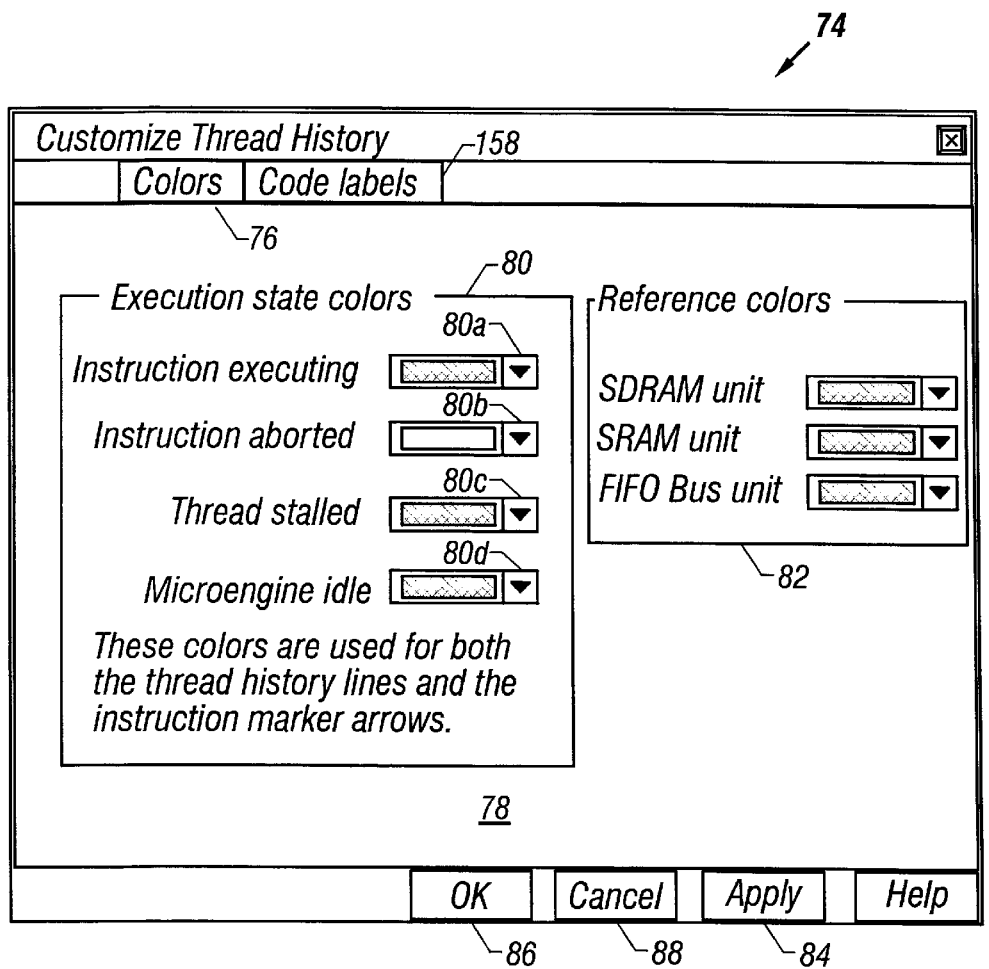
FIG. 4 is a window for customizing the GUI.
Figure 10:
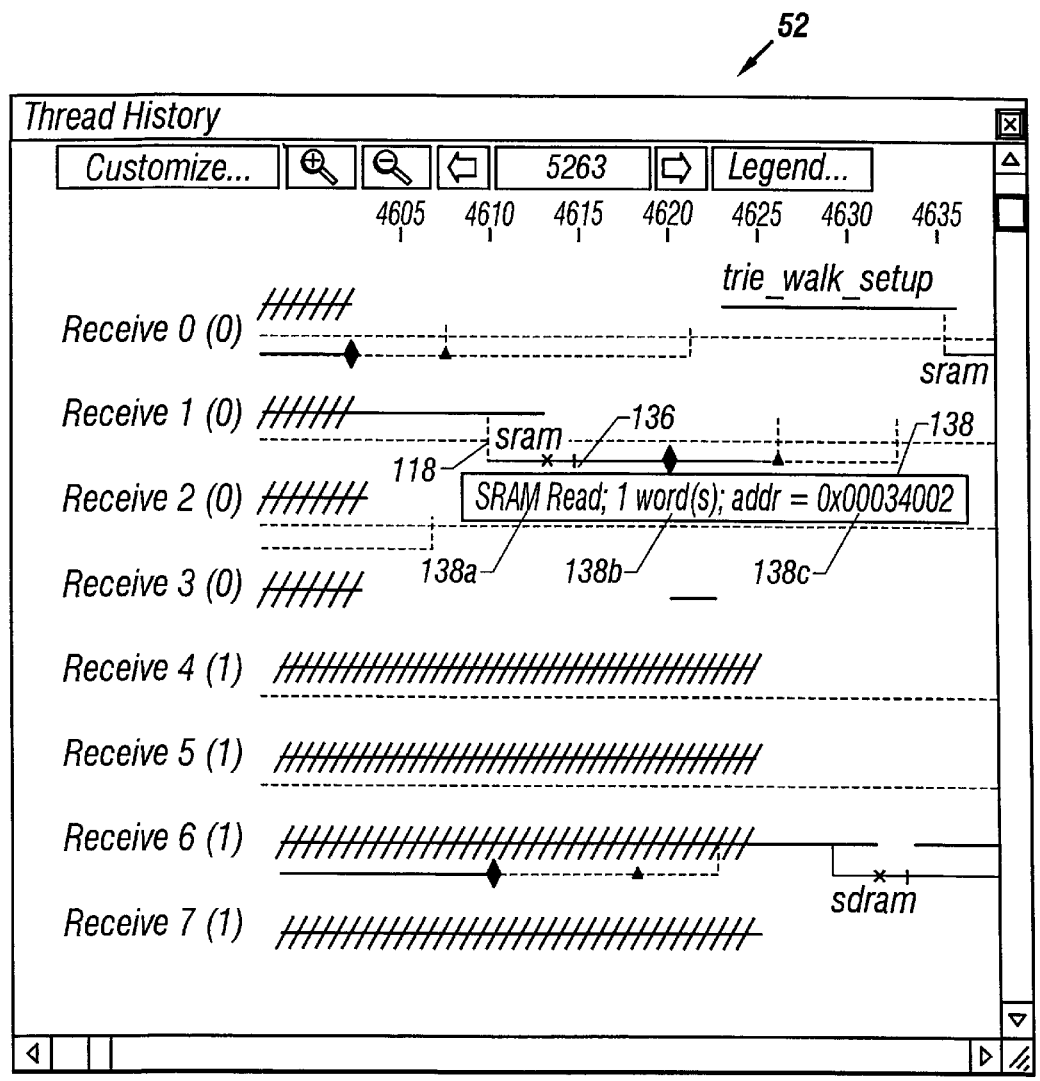
FIG. 10 shows information available from the GUI.

The device identifiers 112 may be color-coded. In FIG. 4, "Reference colors" 82 may be used to set the colors of identifiers associated with "SDRAM unit" (SDRAM controller 20), "SRAM unit" (SRAM controller 22), and "FIFO bus unit" (Fbus interface unit 16). Information pertaining to reference events associated with a particular device may be obtained simply by pointing (without clicking) a mouse to the corresponding reference event indicators. For example, in FIG. 10, pointing a mouse to point 136 on reference event indicator 118 causes information 138 to be displayed. Information 138 identifies the operation 138a ("SRAM Read") that is being performed at point 136, the amount of data 138b being read ("1 word(s))" at that point, and the address 138c in SRAM 26 from which the data is being read ("addr= 0x00034002").

Figure 11:
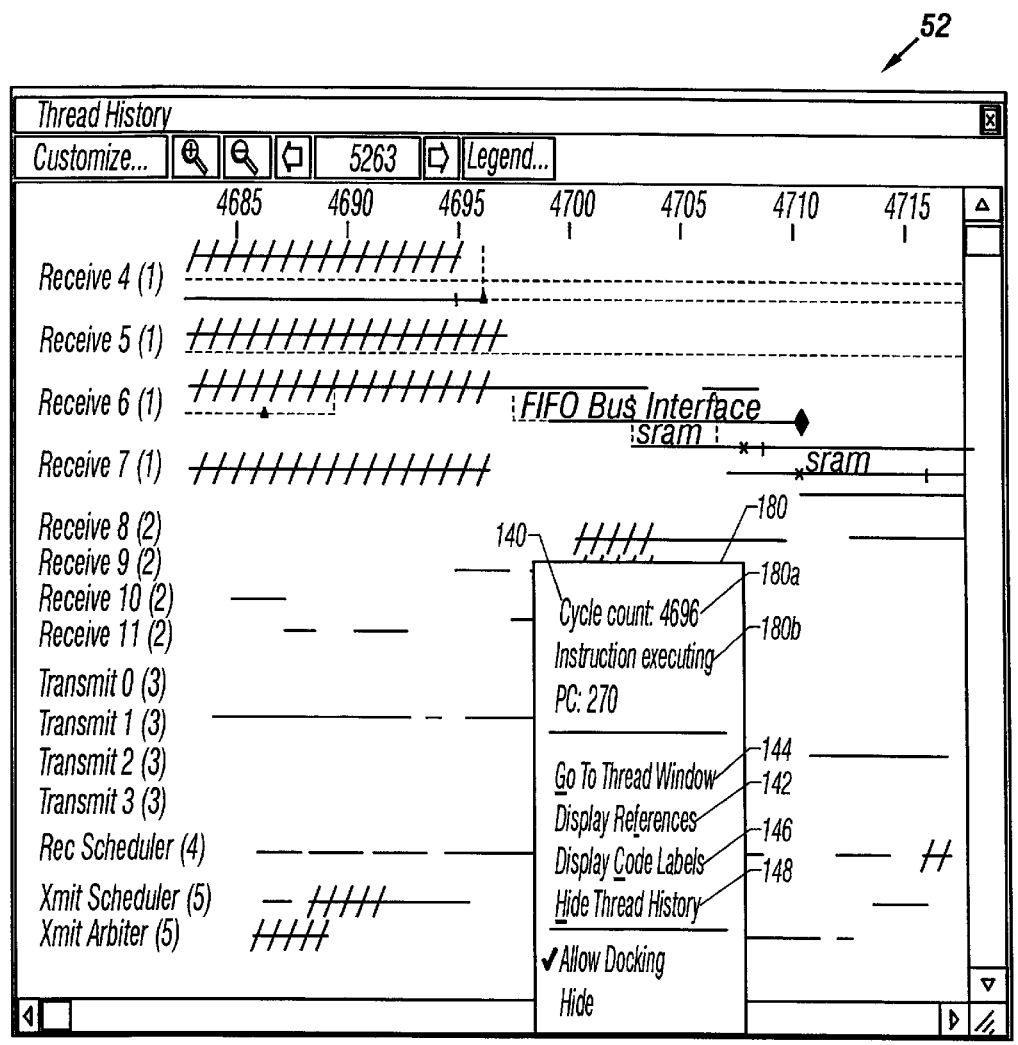
FIG. 11 shows a menu for altering the display configuration of the GUI.

Reference event indicators and associated device identifiers may be added to GUI 52 by placing a mouse on a state indicator and right-clicking on the mouse. This causes menu 140 to be displayed (FIG. 11). Menu 140 provides a "Display References" option 142, selection of which causes event indicators and associated event identifiers to be displayed. Menu 142 includes other options as well, namely, "Go To Thread Window" 144, "Display Code Labels" 146, and "Hide Thread History" 148.

Functions performed by "Hide Thread History" 148 and "Go To Thread Window" 144 are described below. "Display Code Labels" 146 causes a code label 150 (FIG. 8) to be displayed for a selected state indicator 152. Code labels identify routines in threads that are executing at a point selected on a state indicator. For example, code label "slow_port_rec_state" 150 is displayed at point 154 to indicate that a routine called "slow_-port_rec_state" is executing at that point (roughly cycle 4618) in thread 58c.

Figure 12:
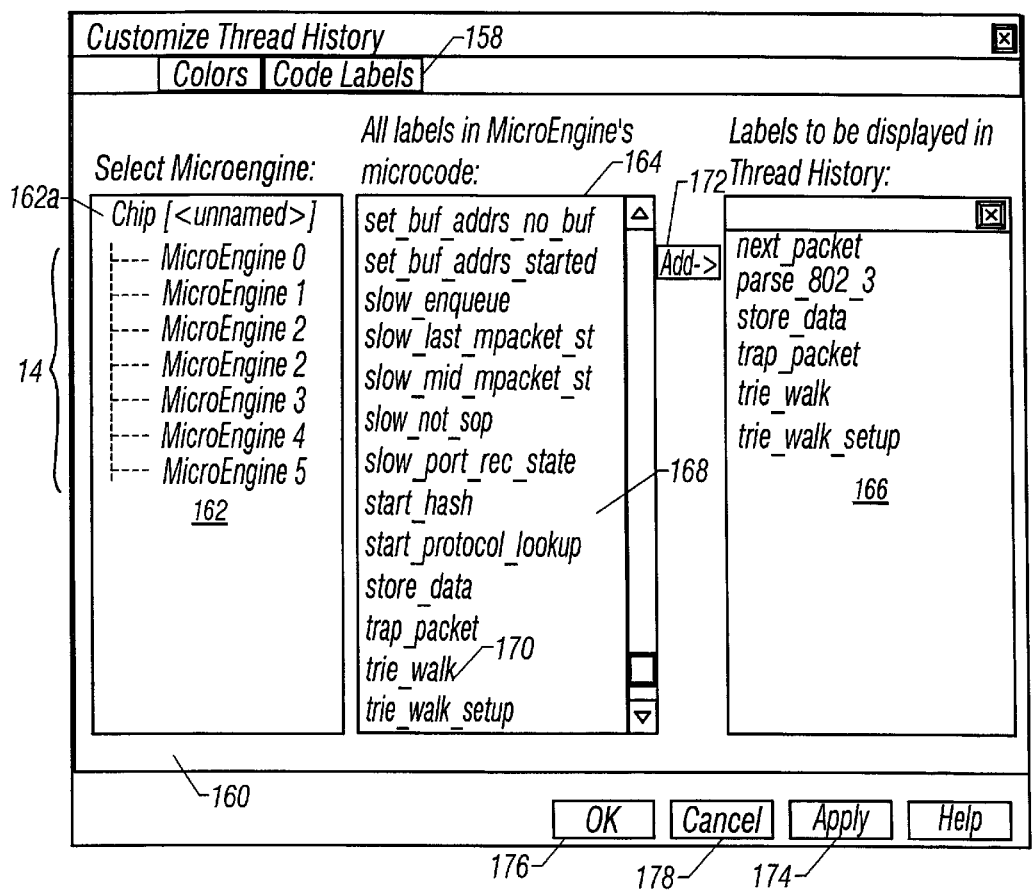
FIG. 12 is a window for selecting code labels to be displayed on the GUI.

The user specifies which code labels in a thread may be displayed on GUI 52. This is done by clicking on "Customize" button 72, thereby causing window 74 to be displayed (FIG. 4). Selecting "Code Labels" tab 158 in window 74 causes window 160 to be displayed (FIG. 12). Window 160 displays "Select MicroEngine:" field 162, "All labels . . . " field 164, and "Labels to be displayed . . . " field 166. Scroll bars, such as 168, allow the user to scroll through information in the fields.

"Select MicroEngine:" field 162 includes a name 162a of the processor 10 being simulated "Chip[<unnamed>]", along with names of the microengines 14 on that processor (here "MicroEngine 0", "MicroEngine 1", "MicroEngine 2", "MicroEngine 3", "MicroEngine 4", and "MicroEngine 5"). Selecting one of microengines 14 causes the names of the routines 170 in that microengine to be displayed in "All labels . . . " field 164. This information is stored in a memory, and can be retrieved by instructions 48.

The user can select (e.g., by pointing and clicking) one or more of routines 170 for display on GUI 52. "Add" button 172 adds the selected routines to "Labels to be displayed" field 166; "Apply" button 174 confirms the selections; "OK" button 176 saves the new selections and "Cancel" button 178 exits window 74 without saving.

Referring back to FIG. 11, menu 140 also displays information 180 relating to a selected point on a state indicator. Information 180 includes the cycle count 180 ("Cycle count: 4696") and the instruction 180b executing at that point ("Instruction executing PC 270").

Figure 13:
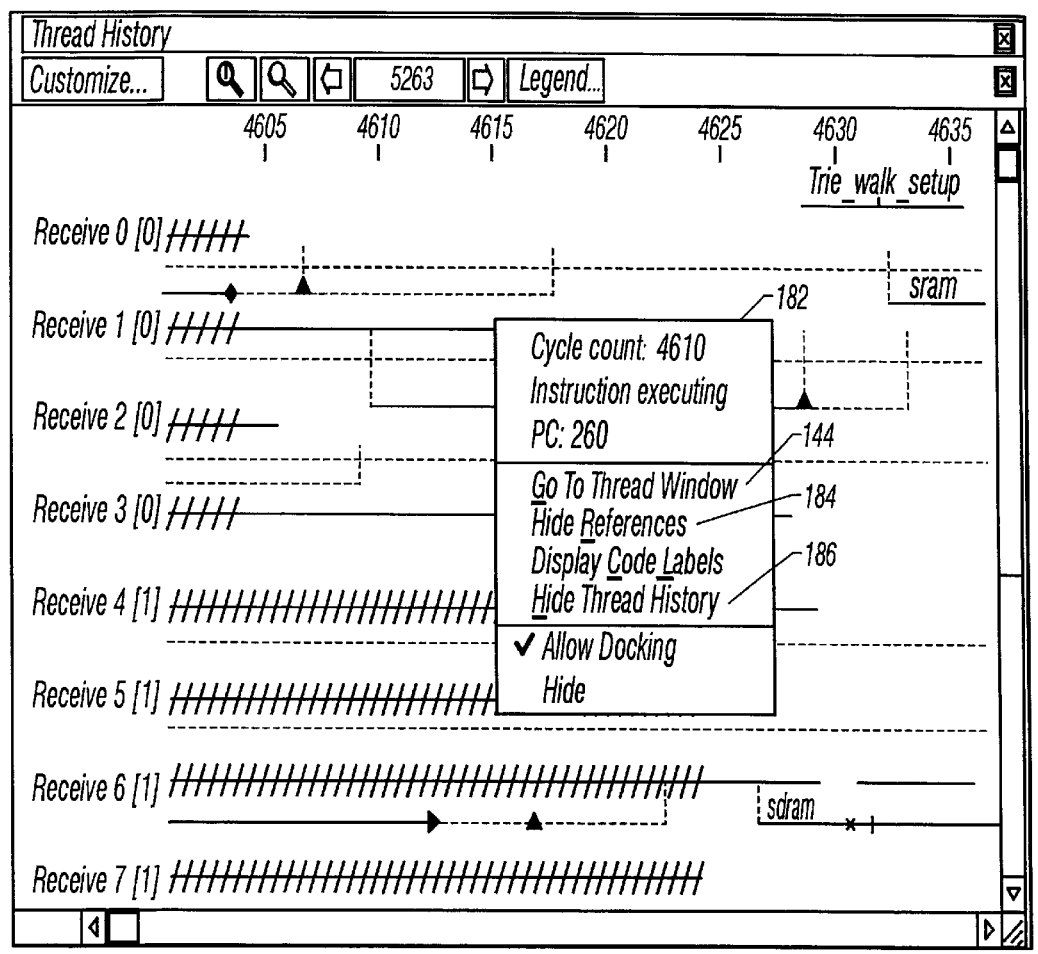
FIG. 13 shows another menu for altering the display configuration of the GUI.

Referring to FIG. 13, an alternative menu 182 is also accessible from GUI 52, which gives the user an option 184 to hide reference indicators ("Hide References") and an option 186 to hide a displayed thread history ("Hide Thread History"). An option (not shown) for hiding code labels may also be provided.

From the menus displayed in FIGS. 11 and 13, selecting "Go To Thread Window" 144 causes thread window 190 (FIG. 6) to be displayed. Thread window 190 displays code in a selected thread that is executing in a range of processor cycles. Code within a range of a selected point on a state indicator is displayed. The lines of code are displayed in a read-only format in the order that they are executed by the microengine that executes thread 58a.

Pointer 192 in thread window 190 identifies the code that is executing at the processor cycle identified in field 100. Pointer 192 is movable in synchronism with pointer 98, and moves relative to computer code 196 in window 190 to indicate which portion of computer code 196 is executing at the time identified in field 100. Thus, the location of pointer 192 may be correlated to a corresponding state indicator for thread 58a to determine what functions the code is causing the thread to perform. Pointer 192 may have the same color as a state indicator at a corresponding processor cycle. For example, if the code relates to a stalled state, the pointer to instructions resulting in the "stall" may also be red.

Field 194 in FIG. 6 indicate the processor cycle that is currently executing ("uEng/SA: 5602"). Field 198 in FIG. 6 identifies an Fbus clock ("2240.00") that corresponds to the processor cycle identified in field 194. Field 200 identifies a location, by line and column number, of a selected point in code 196. (Since no selection has been made in this case, field 200 is empty).

More than one thread window may be displayed at the same time in cases where multiple threads have been selected. For example, in FIG. 14, thread windows 190, 202 and 204 are displayed for corresponding selected threads "Receive 0 (0)", "Transmit 1 (3)", and "Receive 6 (1)". The identities of the threads are shown in thread window headers 190a, 202a, and 204a. The thread window headers also indicate whether the thread has been "Swapped Out", and provide the identity of the instruction executing at the location specified by the pointer in the thread window. For example, in thread window 190, header 190a identifies instruction "PC: 25" as being executed at the location of pointer 192. In FIG. 6, icons 212 and 214 correspond to minimized thread windows, and icon 210 corresponds to "open" window 190.

Referring to FIG. 11, selecting "Hide Thread History" 148 from menu 140 removes a selected thread from view. The entire thread history window 52 may be hidden, as shown in FIG. 15, by selecting "View" pull-down menu 230, followed by the "Debug Windows" option 232 and the "Thread History" option 234 (FIG. 16). The thread history may be re-displayed by re-selecting "Thread History" option 234.

Selecting "Project Workspace" option 231 from "View" pull-down menu 230 displays window 238 (FIG. 17). Window 240, and code to be displayed in window 240, is displayed by pointing and clicking on "thread" icons in window 238. Pointing and clicking on multiple thread icons in window 238 causes multiple windows like window 240 to be displayed. Window 240 identifies, via pointer 241, the code that is currently executing in the selected thread on processor 10. Pointer 241 may have the same color as the state produced by the code to which it is pointing. For example, if the code results in a "stall", pointer 241 may be displayed in red. The thread in which the code is located is highlighted, in this case, "Receive 9 (2)" 242.

Figure 18:
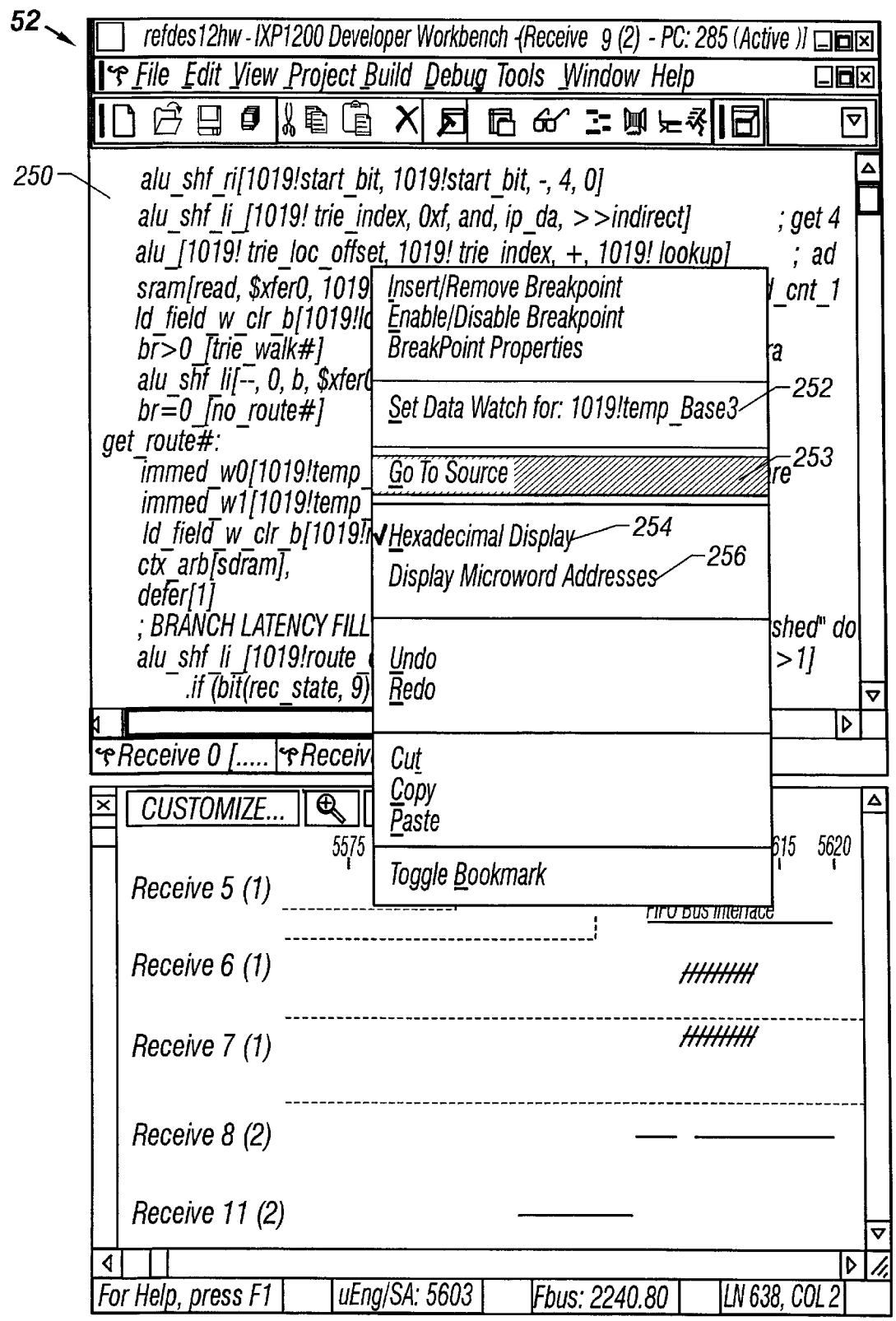
FIG. 18 shows a menu for accessing source code in the threads.

Referring to FIG. 18, right-clicking on an area of thread window 250 causes menu 252 to be displayed. Menu 252 provides hexadecimal and microword address display options 254 and 256, respectively, for displaying code in window 250. Menu 252 also includes "Go To Source" option 258 (shown selected), which retrieves actual source code for the selected thread and displays it in source code window 255 (see FIG. 19). The source code 253 is displayed in "read/write" format, meaning that it can be viewed and edited by the user. Using the "File" pull-down menu 260 and the "Save" or "Save As" option therein (not shown), source code changes made in window 255 can be saved.

Windows shown in FIGS. 3 to 19 also include various icons, such as icon 262 (FIG. 6) which provides a shortcut for displaying thread history information (FIG. 17).

The invention is not limited to the embodiment described herein. For example, the state indicators, reference event indicators, and device identifiers can have different physical representations than those shown in the figures. Likewise, the invention is not limited to the specific functions or to the environments described above. For example, the invention could be extended beyond the realm of displaying simulation data, to display test data obtained by monitoring operation of an actual processor. To implement the GUI with an actual processor, the processor may be programmed to provide and/or store the states of execution displayed on the GUI. This information can then be obtained in the same manner as it was obtained from the simulation program noted above.

It is to be understood that while the invention has been described in conjunction with the detailed description thereof, the foregoing description is intended to illustrate, and not to limit, the scope of the invention. Other aspects, advantages, and modifications are within the scope of the following claims.

What is claimed is:

1. A graphical user interface (GUI) which comprises:
an interactive display showing an operational history of a thread for use in a microengine of a processor, the operational history of the thread being displayed as a graph, the display including an area for receiving a user input comprising selection of a point in time on the graph and for displaying, on the graph and in response to the user input, an event indicator that provides an indication of an event that occurred during execution of the thread at the point in time.

2. The GUI of claim 1, wherein the operational history comprises states of execution of the thread as a function of time.

3. The GUI of claim 2, wherein different states of execution of the thread are displayed as different colors.

4. The GUI of claim 3, wherein the different states comprise a first state in which the thread is executing, a second state in which the thread has been aborted, and a third state in which the thread is stalled.

5. The GUI of claim 2, further comprising a code label that is displayed relative to a state of execution of computer code in the thread, the code label corresponding to a routine in the computer code that is executing at the state of execution.

6. The GUI of claim 5, further comprising a window for selecting code labels to be displayed.

7. The GUI of claim 2, wherein time is defined in terms of cycles of the processor.

8. The GUI of claim 1, which also displays operational states associated with the microengine.

9. The GUI of claim 8, wherein the operational states associated with the microengine comprise a first state in which the microengine is idle, and a second state in which the microengine is disabled.

10. The GUI of claim 1, wherein the event indicator comprises one or more of the following: a first indicator which indicates that the thread has issued a reference to a device, a second indicator which indicates that the reference has been queued by the device, a third indicator which indicates that the reference has been removed from a queue by the device for processing, a fourth indicator which indicates that processing is done, a fifth indicator which indicates that a signal has been issued to the thread that processing is done, and a sixth indicator which indicates that the signal has been consumed by the thread.

11. The GUI of claim 1, wherein:
the reference events relate to a device in communication with the thread; and
the GUI further comprises an identifier which identifies the device to which the reference events relate.

12. The GUI of claim 1, further comprising a window which shows computer code for the thread.

13. The GUI of claim 12, further comprising:
a first pointer which is movable through states of execution of the computer code; and
a second pointer which is movable relative to the computer code to indicate a portion of the computer code executing at a state of execution.

14. The GUI of claim 13, further comprising multiple windows for showing computer code corresponding to more than one of the multiple threads.

15. The GUI of claim 1, wherein the display shows operational histories of multiple threads for use in microengines of the processor.

16. The GUI of claim 1, wherein the event indicator identifies an entity with which the thread interacts at the point in time, the entity comprising at least one of a hardware device with which the thread interacts and a software routine with which the thread interacts.

17. A graphical user interface (GUI) comprising:
state indicators which show states of execution of threads running in microengines of a processor, the state indicators showing the states of execution graphically as functions of clocking in the processor; and
a window showing computer code corresponding to one of the threads;
wherein the state indicators receive a user input comprising selection of a point in time on a graph corresponding to a state indicator and display, on the graph and in response to the user input, an event indicator that provides an indication of an event that occurred during execution of the thread at the point in time.

18. The GUI of claim 17, wherein the state indicators show different states of execution in different colors.

19. The GUI of claim 17, further comprising identifiers which identify devices to which the event relates.

20. The GUI of claim 17, further comprising:
a first pointer which is movable relative to one of the state indicators; and
a second pointer which is movable relative to the computer code in the window to indicate a portion of the computer code executing at a state of execution.

21. The GUI of claim 17, wherein the state indicators are linear and are displayed relative to cycles of the processor.

22. The GUI of claim 17, wherein the window shows the computer code in read-only format.

23. The GUI of claim 22, further comprising an option to display the computer code in read/write format.

24. The GUI of claim 17, wherein the event indicator identifies an entity with which the thread interacts at the point in time, the entity comprising at least one of a hardware device with which the thread interacts and a software routine with which the thread interacts.

25. A computer program stored on a computer-readable medium, the computer program comprising instructions that cause a computer to generate a graphical user interface (GUI), the GUI comprising:

state indicators which show states of execution of threads running in microengines of a processor, the state indicators showing the states of execution graphically as functions of clocking in the processor; and a window showing computer code corresponding to one of the threads;

wherein the state indicators receive a user input comprising selection of a point in time on a graph corresponding to a state indicator and display, on the graph and in response to the user input, an event indicator that provides an indication of an event that occurred during execution of the thread at the point in time.

26. The computer program of claim 25, wherein the event indicator identifies an entity with which the thread interacts at the point in time, the entity comprising at least one of a hardware device with which the thread interacts and a software routine with which the thread interacts.

27. An apparatus for generating a graphical user interface (GUI), the apparatus comprising:

a processor which executes computer instructions to generate a GUI, the GUI comprising:

state indicators which show states of execution of threads running in microengines of a processor, the state indicators showing the states of execution graphically as functions of clocking in the processor; and a window showing computer code corresponding to one of the threads;

wherein the state indicators receive a user input comprising selection of a point in time on a graph corresponding to a state indicator and display, on the graph and in response to the user input, an event indicator that provides an indication of an event that occurred during execution of the thread at the point in time.

28. The apparatus of claim 27, wherein the event indicator identifies an entity with which the thread interacts at the point in time, the entity comprising at least one of a hardware device with which the thread interacts and a software routine with which the thread interacts.

* * * * *